United States Patent
Teramoto et al.

(10) Patent No.: US 10,972,490 B2
(45) Date of Patent: Apr. 6, 2021

(54) SPECIFYING SYSTEM, SPECIFYING DEVICE, AND SPECIFYING METHOD

(71) Applicant: NIPPON TELEGRAPH AND TELEPHONE CORPORATION, Chiyoda-ku (JP)

(72) Inventors: Yasuhiro Teramoto, Musashino (JP); Bo Hu, Musashino (JP); Toshiharu Kishi, Musashino (JP); Yukio Nagafuchi, Musashino (JP); Takaaki Koyama, Musashino (JP); Hideo Kitazume, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 238 days.

(21) Appl. No.: 15/765,527

(22) PCT Filed: Oct. 5, 2016

(86) PCT No.: PCT/JP2016/079620
§ 371 (c)(1),
(2) Date: Apr. 3, 2018

(87) PCT Pub. No.: WO2017/061469
PCT Pub. Date: Apr. 13, 2017

(65) Prior Publication Data
US 2019/0081970 A1    Mar. 14, 2019

(30) Foreign Application Priority Data

Oct. 6, 2015 (JP) .............................. JP2015-198753

(51) Int. Cl.
*H04L 29/06* (2006.01)
*G06F 21/56* (2013.01)
(Continued)

(52) U.S. Cl.
CPC .......... *H04L 63/1425* (2013.01); *G06F 17/10* (2013.01); *G06F 21/56* (2013.01);
(Continued)

(58) Field of Classification Search
CPC ............. H04L 2463/146; H04L 41/082; H04L 41/28; G06F 17/10
See application file for complete search history.

(56) References Cited

U.S. PATENT DOCUMENTS 8,341,745 B1 * 12/2012 Chau ....................... G06F 21/56
 726/24
8,381,289 B1 * 2/2013 Pereira .................. H04L 63/145
 726/22
(Continued)

FOREIGN PATENT DOCUMENTS

JP    2008-141398 A    6/2008
JP    2009-117929 A    5/2009
(Continued)

OTHER PUBLICATIONS

C. Wang, S. Fu, X. Bai and L. Bai, "Risk Perception in Modeling Malware Propagation in Networks," 2009 WRI World Congress on Computer Science and Information Engineering, Los Angeles, CA, 2009, pp. 35-39, doi: 10.1109/CSIE.2009.115. (Year: 2009).*

(Continued)

*Primary Examiner* — Madhuri R Herzog
(74) *Attorney, Agent, or Firm* — Oblon, McClelland, Maier & Neustadt, L.L.P.

(57) ABSTRACT

A specifying device receives detection information from a security device that detects hacking into a network or an activity of a terminal related to infection, and specifies a state of the terminal from information of the terminal and content of activity of the terminal included in the detection information. The specifying device specifies, when specify-
(Continued)

ing that the terminal is in the state of being infected with malware, a terminal that may be infected before performing the content of the activity of the terminal included in the detection information based on connection information stored in a configuration information storage device, and specifies a terminal located on a route, along which the infected terminal is likely to be used for hacking or for infection of the terminal in the future, as a candidate for an infected terminal likely to be infected.

8 Claims, 10 Drawing Sheets

(51) Int. Cl.
    *G06F 17/10*     (2006.01)
    *H04L 12/24*     (2006.01)

(52) U.S. Cl.
    CPC ............ *H04L 41/082* (2013.01); *H04L 41/28* (2013.01); *H04L 63/145* (2013.01); *H04L 63/1416* (2013.01); *H04L 2463/146* (2013.01)

(56) References Cited

U.S. PATENT DOCUMENTS

| | | | | |
|---|---|---|---|---|
| 8,813,236 | B1* | 8/2014 | Saha | ................... H04L 63/1408 726/22 |
| 9,148,441 | B1 | 9/2015 | Tamersoy et al. | |
| 10,164,995 | B1* | 12/2018 | Fang | ..................... G06F 21/577 |
| 2005/0138413 | A1 | 6/2005 | Lippmann et al. | |
| 2007/0150957 | A1 | 6/2007 | Hartrell et al. | |
| 2012/0137342 | A1 | 5/2012 | Hartrell et al. | |
| 2012/0144490 | A1 | 6/2012 | Hartrell et al. | |
| 2013/0167231 | A1* | 6/2013 | Raman | ................ H04L 63/1416 726/23 |
| 2015/0013007 | A1 | 1/2015 | Hartrell et al. | |
| 2015/0101010 | A1 | 4/2015 | Hartrell et al. | |
| 2015/0195299 | A1* | 7/2015 | Zoldi | ................... H04L 63/1408 726/25 |
| 2018/0262516 | A1* | 9/2018 | Zomlot | ............... H04L 61/1511 |

FOREIGN PATENT DOCUMENTS

| | | |
|---|---|---|
| JP | 2011-101172 A | 5/2011 |
| JP | 2015-95159 A | 5/2015 |

OTHER PUBLICATIONS

L. Liu et al., "Detecting malicious clients in ISP networks using HTTP connectivity graph and flow information," 2014 IEEE/ACM International Conference on Advances in Social Networks Analysis and Mining (ASONAM 2014), Beijing, 2014, pp. 150-157, doi: 10.1109/ASONAM.2014.6921576. (Year: 2014).*

K. M. Carter, N. Idika and W. W. Streilein, "Probabilistic Threat Propagation for Network Security," in IEEE Transactions on Information Forensics and Security, vol. 9, No. 9, pp. 1394-1405, Sep. 2014, doi: 10.1109/TIFS.2014.2334272. (Year: 2014).*

International Search Report dated Dec. 27, 2016 in PCT/JP2016/079620 filed Oct. 5, 2016.

Abraham, S. et al., "A Predictive Framework for Cyber Security Analytics Using Attack Graphs", International Journal of Computer Networks & Communications (IJCNC), vol. 7, No. 1, Jan. 2015, 17 total pages.

Extended European Search Report dated Mar. 1, 2019 in European Patent Application No. 16853623.3, 7 pages.

* cited by examiner

| TERMINAL NAME | IP ADDRESS | MAC ADDRESS | CONNECTION INFORMATION |
|---|---|---|---|
| TERMINAL 1 | 10.1.1.1 | 70:58:12:27:B7:17 | MAIL SERVER → TERMINAL 1, TERMINAL 1 → TERMINAL 3 |
| TERMINAL 2 | 10.1.2.1 | 70:58:12:27:B7:16 | MAIL SERVER → TERMINAL 2, TERMINAL 2 → TERMINAL 3, TERMINAL 2 → TERMINAL 4 |

FIG.3

| TERMINAL NAME | TERMINAL STATE | INFECTION SUSPICION SCORE | INFECTION RISK SCORE |
|---|---|---|---|
| TERMINAL 1 | INFECTION SUSPECTED | 0.33 | 0.1 |
| TERMINAL 2 | INFECTION SUSPECTED | 0.33 | 0.1 |
| TERMINAL 3 | INFECTED | 1.0 | 0.1 |
| TERMINAL 4 | NOT INFECTED | 0 | 0.13 |
| TERMINAL 5 | CANDIDATE FOR INFECTION SPREAD | 0 | 0.1 |

SPECIFYING SYSTEM, SPECIFYING DEVICE, AND SPECIFYING METHOD

FIELD

The present invention relates to a specifying system, a specifying device, and a specifying method.

BACKGROUND

Conventionally the existence of malicious software created by the intention of performing illegal and harmful operations such as computer viruses, spyware, or bots and of illegal software such as program codes, which are called malware, is known.

For example, there is Attack Graph as a technique for calculating propagation path candidates for a target-type attack and an APT (Advanced Persistent Threat) attack by such malware. The attack graph is a technique for evaluating network threats by collecting configurations of network systems and OS/application information of terminals and statically calculating invasion route candidates of external attackers.

CITATION LIST

Patent Literature

Non Patent Literature 1: Subil Abraham, Suku Nair, "A Predictive Framework for Cyber Security Analytics using Attack Graphs", IJCNC 2015.

SUMMARY

Technical Problem

However, in the conventional technique, there is a problem that a terminal suspected of infection or a candidate for an infected terminal likely to be infected in the future cannot be appropriately specified. For example, the target-type attack or the APT attack has a feature that a plurality of terminals in the same network are hacked or infection is spread thereto via a terminal hacked or infected with malware, and even if dealing with the infected terminal detected by a security device such as shut-down, if there is other infected terminal which is not detected, attacks are continued via the terminal. In this case, in the conventional techniques, it is not able to appropriately specify a terminal suspected of infection or a candidate for an infected terminal likely to be infected in the future on the route to the detected terminal.

Solution to Problem

A specifying system includes a configuration information storage device that stores information on a terminal in a network and a specifying device that specifies a state of the terminal, wherein the configuration information storage device stores connection information indicating a connection relation between terminals in the network, and the specifying device includes a state specifying unit that receives detection information from a security device that detects hacking into the network or an activity of a terminal related to infection and specifies a state of the terminal from information of the terminal and content of activity of the terminal included in the detection information, and an infection specifying unit that specifies, when the state specifying unit specifies that the terminal is in the state of being infected with malware, a terminal that may be infected before performing the content of the activity of the terminal included in the detection information based on the connection information stored in the configuration information storage device, and that specifies a terminal located on a route, along which the infected terminal is likely to be used for hacking or for infection of the terminal in the future, as a candidate for an infected terminal likely to be infected.

A specifying device includes: a state specifying unit that receives detection information related to detection from a security device that detects hacking into a network including a plurality of terminals or an activity of a terminal related to infection, and specifies a state of the terminal from information of the terminal and content of activity of the terminal included in the detection information, and an infection specifying unit that specifies, when the state specifying unit specifies that the terminal is in the state of being infected with malware, a terminal that may be infected before performing the content of the activity of the terminal included in the detection information based on connection information indicating a connection relation between the terminals in the network, and that specifies the terminal located on a route, along which the infected terminal is likely to be used for hacking or for infection of the terminal in the future, as a candidate for an infected terminal likely to be infected.

A specifying method executed by a specifying device, the method includes: a state specifying step of receiving detection information related to detection from a security device that detects hacking into a network including a plurality of terminals or an activity of a terminal related to infection, and specifying a state of the terminal from information of the terminal and content of activity of the terminal included in the detection information; and an infection specifying step of specifying, when the terminal is in the state of being infected with malware is specified at the state specifying step, a terminal that may be infected before performing the content of the activity of the terminal included in the detection information based on connection information indicating a connection relation between the terminals in the network, and specifying a terminal located on a route, along which the infected terminal is likely to be used for hacking or for infection of the terminal in the future, as a candidate for an infected terminal likely to be infected.

Advantageous Effects of Invention

According to the present invention, it is possible to appropriately specify a terminal suspected of infection or a candidate for an infected terminal likely to be infected in the future.

DESCRIPTION OF EMBODIMENTS

Exemplary embodiments of the specifying system, the specifying device, and the specifying method according to the present application will be explained in detail below with reference to the accompanying drawings. It should be noted that the embodiments are not intended to limit the specifying system, the specifying device, and the specifying method according to the present application.

First Embodiment

In the following embodiments, a configuration of a specifying system and a process flow of a specifying device and the specifying system according to a first embodiment will be sequentially explained, and finally advantageous effects of the first embodiment will be explained.

Configuration of Specifying System

Figure 1:
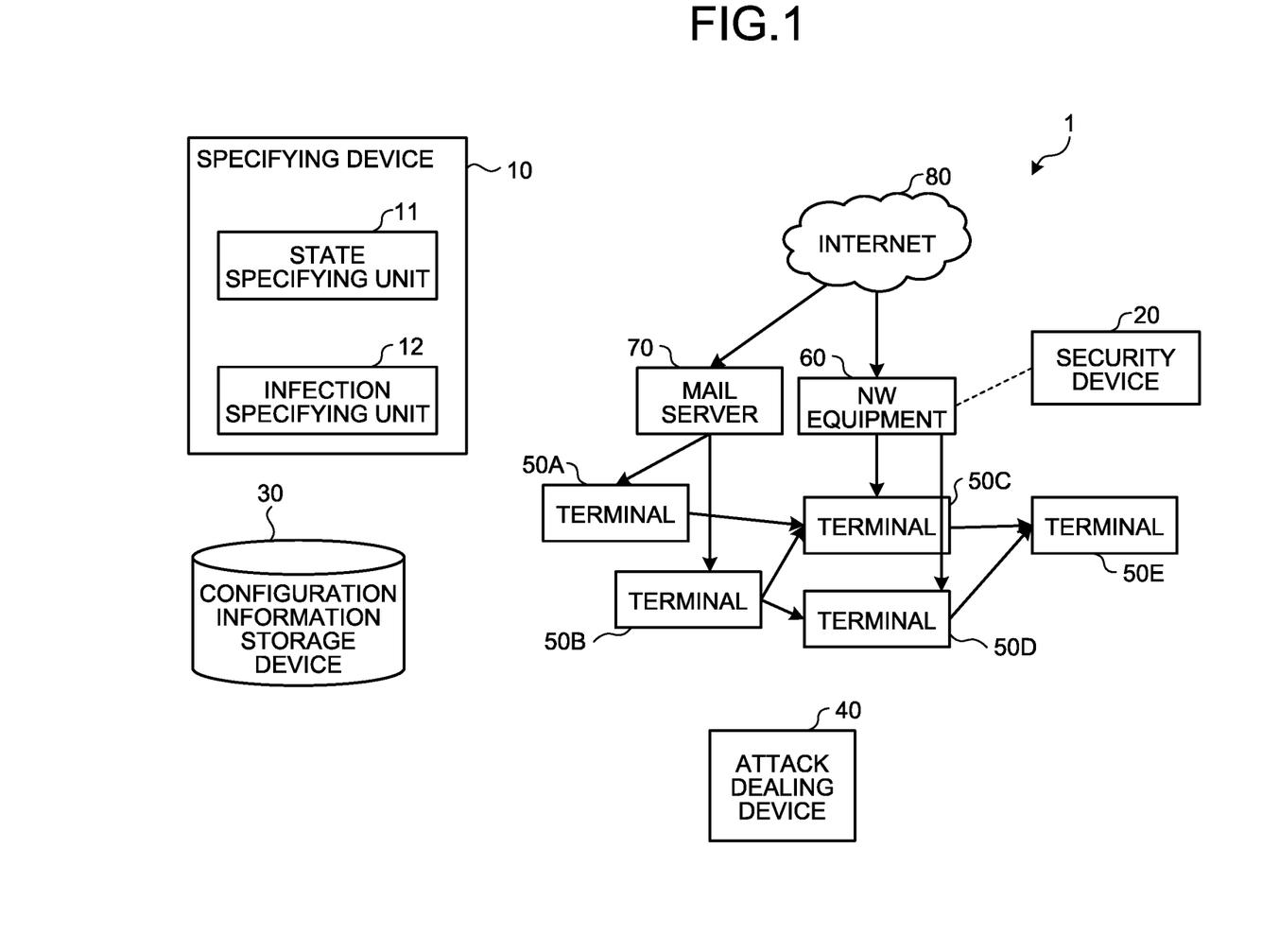
FIG. 1 is a diagram illustrating an example of a specifying system configuration according to a first embodiment.

FIG. 1 is a diagram illustrating an example of a specifying system configuration according to the first embodiment. A specifying system 1 according to the first embodiment includes a specifying device 10 that specifies a terminal suspected of infection or a candidate for a terminal likely to be infected in the future, a security device 20 that monitors communication, a configuration information storage device 30 that stores information on terminals 50A to 50E in a network, an attack dealing device 40 that monitors communication and restricts communication, the terminals 50A to 50E, NW (Network) equipment 60 such as a firewall, a router, and a switch, and a mail server 70 that provides network services.

The NW equipment 60 and the mail server 70 are connected to Internet 80. A network including the terminals 50A to 50E is assumed to permit only communication necessary for business execution using an ACL (Access Control List) of the firewall or the like. As illustrated in FIG. 1, communication permitted by the firewall and logical communication of service connectivity (mail, HTTP Proxy, and authentication system, etc.) are indicated by arrows of equipment connections. The number of devices and functions illustrated in FIG. 1 are only examples, and the embodiment is not limited thereto. In addition, when describing the terminals 50A to 50E with no particular distinction, any one of them is written as a terminal 50 when necessary.

The security device 20 monitors communication of the terminals 50A to 50E in the network and of the NW equipment 60, and transmits, when detecting unauthorized communication etc., detection information to the specifying device 10. The detection information includes the information of the terminal 50 that performs unauthorized communication or the content of the activity of the terminal 50, or the like.

The configuration information storage device 30 stores connection information indicating a connection relation between terminals in the network. For example, as illustrated in FIG. 2, the configuration information storage device 30 stores "Terminal name" indicating a name of a terminal, "IP address" indicating an IP address of the terminal, "MAC address" indicating an MAC address of the terminal, and "Connection information" indicating a connection relation between terminals in association with each other.

Figure 2:
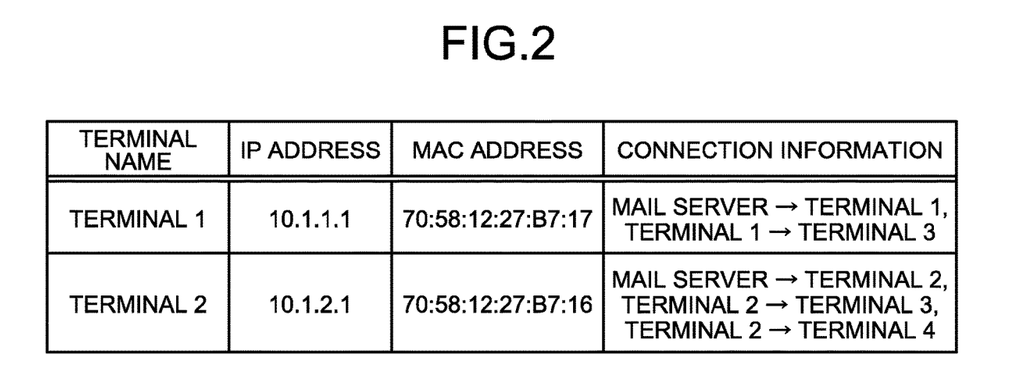
FIG. 2 is a diagram illustrating an example of connection information of a terminal stored in a configuration information storage device according to the first embodiment.

When describing the example by referring to FIG. 2, the configuration information storage device 30 stores a terminal name "Terminal 1", an IP address "10.1.1.1", an MAC address "70:58:12:27:B7:17", and connection information "Mail server→Terminal 1, Terminal 1→Terminal 3" in association with each other. This indicates that the IP address of the terminal 1 is "10.1.1.1", the MAC address is "70:58:12:27:B7:17", and the mail server 70 and the terminal 3 are connected to each other.

The configuration information storage device 30 also stores state information of a terminal indicating the state of the terminal 50 specified by a state specifying unit 11 explained later, and a terminal suspected of infection and a candidate for an infected terminal which are specified by an infection specifying unit 12 explained later. For example, as illustrated in FIG. 3, the configuration information storage device 30 stores "Terminal name" indicating the name of a terminal, "Terminal state" indicating the state of a terminal, "Infection suspicion score" indicating the degree of suspicion of infection, and "Infection risk score" indicating the degree of risk of infection in association with each other.

Here, the terminal state includes "Infection suspected", "Infected", "Not infected", "Candidate for infection spread", and "Attacked". "Infection suspected" indicates the state of being suspected of infection. "Infected" indicates the state in which infection is determined. "Not infected" indicates the state in which it is not infected. "Candidate for infection spread" indicates the state in which it is likely to be infected in the future. "Attacked" indicates the state in which it is attacked from the infected terminal or the like. The infection suspicion score indicates that the higher the numerical value is, the infection may be more suspicious, and the infection risk score indicates that the higher the numerical value is, the infection in the future may be higher.

Figure 3:
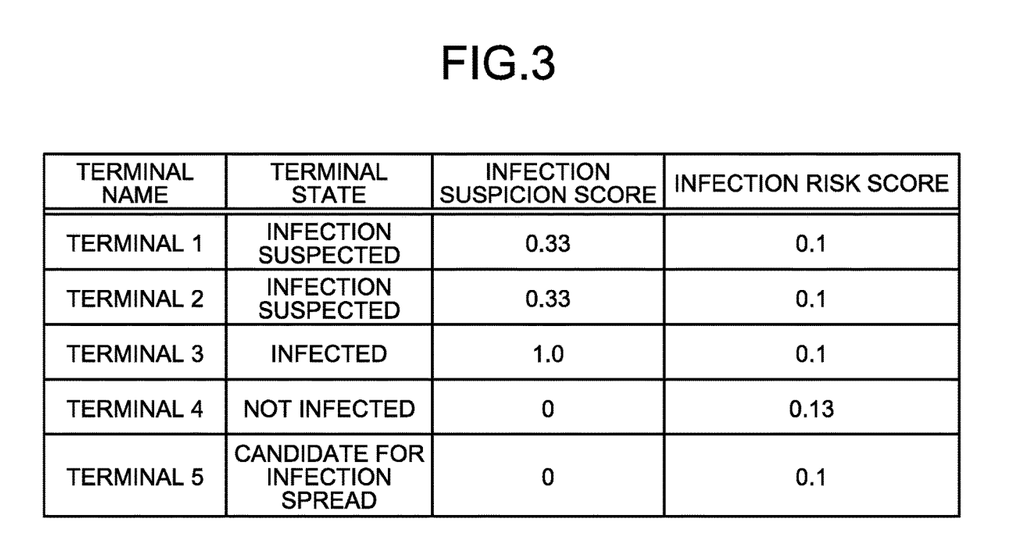
FIG. 3 is a diagram illustrating an example of state information of the terminal stored in the configuration information storage device according to the first embodiment.

When describing the example by referring to FIG. 3, the configuration information storage device 30 stores the terminal name "Terminal 1", the terminal state "Infection suspected", the infection suspicion score "0.33", and the infection risk score "0.1" in association with each other. This indicates that the current state of the terminal 1 is in a state of being suspected of infection, that the infection suspicion score is "0.33", and that the infection risk score is "0.1".

Here, the terminal name "Terminal 1" corresponds to the terminal 50A in FIG. 1, the terminal name "Terminal 2" corresponds to the terminal 50B in FIG. 1, the terminal name "Terminal 3" corresponds to the terminal 50C in FIG. 1, the terminal name "Terminal 4" corresponds to the terminal 50D in FIG. 1, and the terminal name "Terminal 5" corresponds to the terminal 50E in FIG. 1.

The attack dealing device 40 performs block of communication, monitor of communication, or control of communication on an infected terminal specified by the state specifying unit 11 explained later and on a terminal highly suspected of infection among terminals suspected of infection specified by the infection specifying unit 12, explained later.

The specifying device 10 specifies the state of a terminal and specifies a terminal suspected of infection and a terminal likely to be infected in the future. As illustrated in FIG. 1, the specifying device 10 includes the state specifying unit 11 and the infection specifying unit 12.

The state specifying unit 11 receives detection information from the security device 20 that detects hacking into the network or activity of the terminal 50 related to infection, and specifies the state of the terminal 50 from the information of the terminal 50 and the content of the activity of the relevant terminal included in the detection information. For example, when the detection information is the information on communication, the state specifying unit 11 specifies the states of terminals 50 corresponding to the source address and the destination address of the communication, and specifies the state of the terminal 50 when the detection information is the information on the terminal 50.

Explaining the specific example, for example, when the detection information is information indicating that the "Terminal 4" attacks the "Terminal 5" as a result that the "Terminal 4" communicates with the "Terminal 5", the state specifying unit 11 determines that it is the information on communication, and specifies the state of the "Terminal 4" corresponding to the source address of the communication and the state of the "Terminal 5" corresponding to the destination address thereof. For example, when the detection information is information indicating that the "Terminal 3" is infected with malware, the state specifying unit 11 determines it as the information on the terminal 50 and specifies the state of the "Terminal 3".

Figure 4:
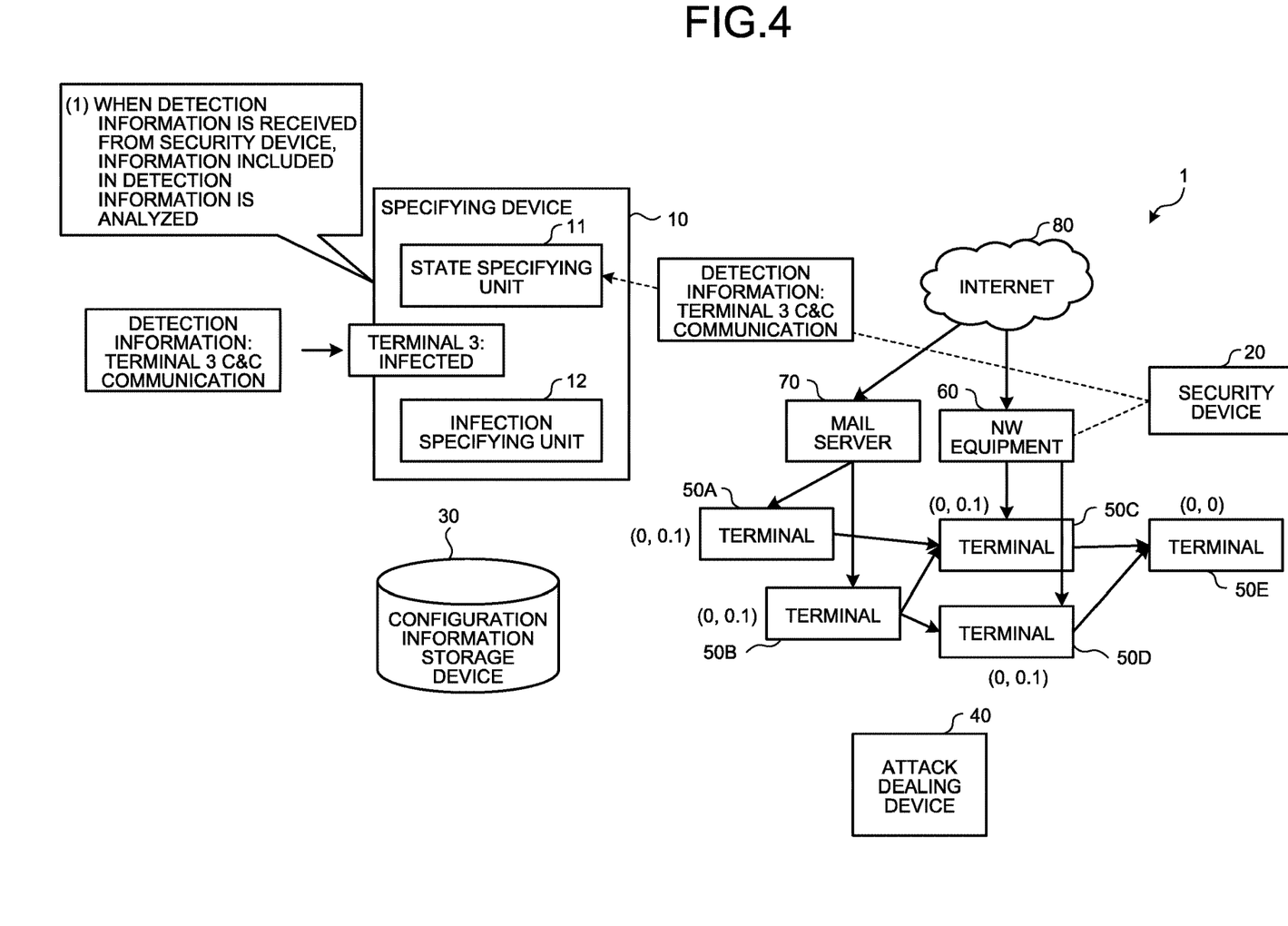
FIG. 4 is a diagram for explaining a process of specifying a state of a terminal in a specifying device according to the first embodiment.

The process of specifying a state of a terminal in the specifying device 10 will be explained below with reference to FIG. 4. FIG. 4 is a diagram for explaining the process of specifying the state of a terminal in the specifying device according to the first embodiment. As illustrated in FIG. 4, the numbers next to each of the terminals 50A to 50E are numerical examples of the infection suspicion score and the infection risk score of the relevant terminal. In the state in which the terminals are not attacked, the numerical value of infection suspicion is "0" in all the terminals 50. The infection risk is set in the terminals 50 connected to the Internet 80 by certain rules. In the example of FIG. 4, although the numerical value "0.1" is added to terminals directly connected to the Internet 80 and to the infected terminal, it is not limited thereto, and how to determine the numerical value can be arbitrarily set.

In the example of FIG. 4, the process in the case where the terminal 50C which is the terminal name "Terminal 3" is infected with malware and the security device 20 provided in the network detects C&C communication which is communication performed with a server of an external network in order to control the infected terminal from the outside will be explained below. As illustrated in FIG. 4, the state specifying unit 11 of the specifying device 10 specifies the state of the terminal 50C based on the information indicating that the terminal 3 performs the C&C communication with an external device included in the detection information received from the security device 20. Here, when detecting the C&C communication of the terminal 3, because it can be determined that the terminal 3 is definitely infected with malware, the state specifying unit 11 specifies the state of the terminal 3 as an infected state and sets the infection suspicion score to "1.0".

When the state specifying unit 11 specifies that the terminal 50 is in a state of being infected with malware, the infection specifying unit 12 specifies the terminal 50 that may be infected before performing the content of the activity of the terminal 50 included in the detection information based on the connection information stored in the configuration information storage device 30, and specifies the terminal 50 located on a route, along which the infected terminal 50 is likely to be used for hacking or for infection of the terminal in the future, as a candidate for an infected terminal likely to be infected.

For example, the infection specifying unit 12 specifies the terminal 50 included in the communication route that can be an infection route of the infected terminal specified by the state specifying unit 11 as a terminal 50 suspected of infection, and calculates a numerical value indicating the degree of suspicion of infection of each terminal 50 suspected of infection based on the number of communication routes that can be an infection route and the states of the terminals in the past.

For example, the infection specifying unit 12 specifies the terminal 50 that can be infected from the infected terminal, with the infected terminal specified by the state specifying unit 11 as a starting point, as a candidate for an infected terminal likely to be infected using the connection information.

Figure 5:
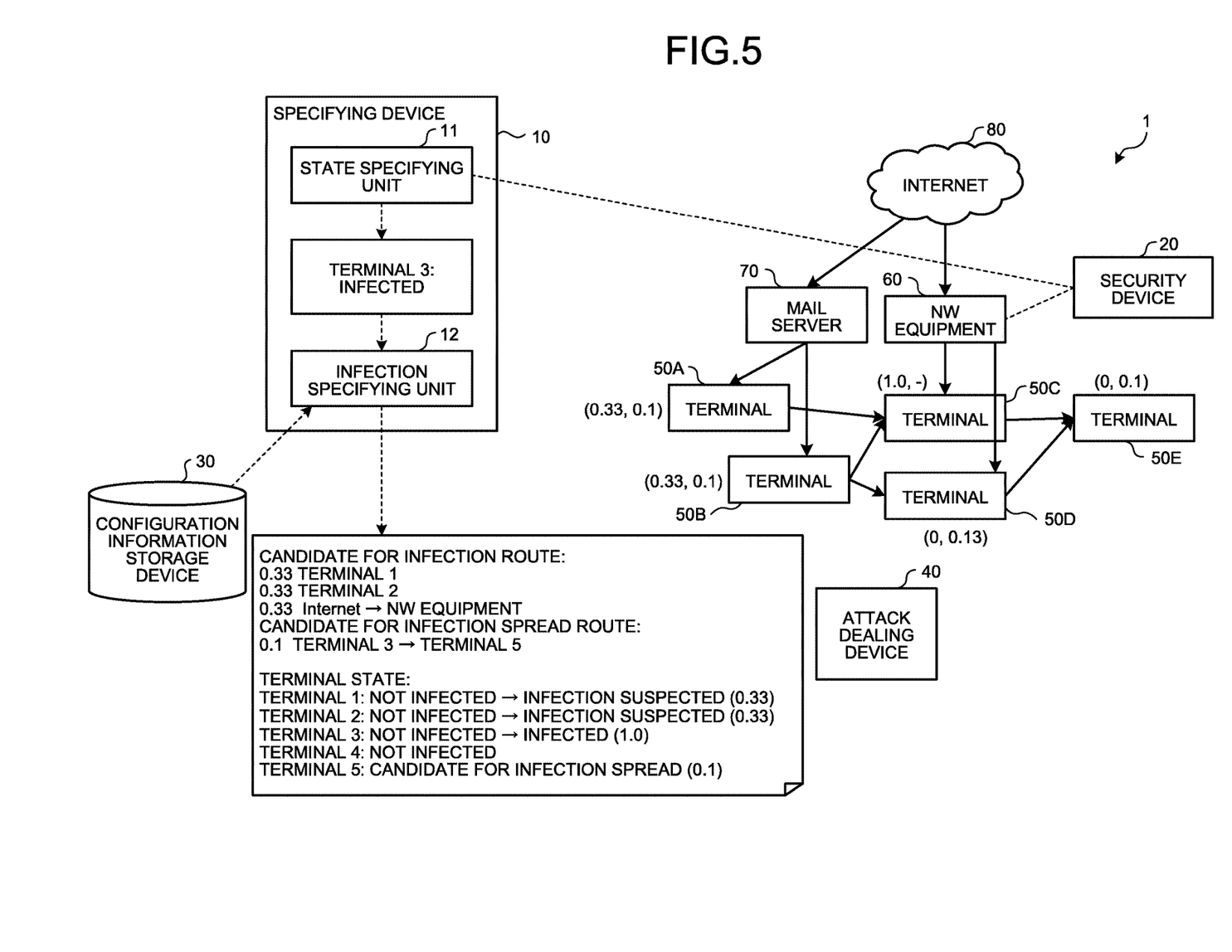
FIG. 5 is a diagram for explaining a process of specifying a terminal suspected of infection and a candidate for an infected terminal in the specifying device according to the first embodiment.

Here, the process of specifying a terminal 50 suspected of infection and a candidate for an infected terminal in the specifying device 10 will be explained with reference to FIG. 5. FIG. 5 is a diagram for explaining a process of specifying a terminal suspected of infection and a candidate for an infected terminal in the specifying device according to the first embodiment. In the example of FIG. 5, it is assumed that the state specifying unit 11 specifies the state of the "Terminal 3" as an infected state and sets the infection suspicion score to "1.0".

When the state of the "Terminal 3" included in the detection information is specified, the infection specifying unit 12 of the specifying device 10 first specifies an infection route of the terminal 3 using the connection information of the configuration information storage device 30. In the example of FIG. 5, there are three possible routes of attack in total as a candidate for an infection route to the terminal 3: direct attack via the NW equipment 60 from the Internet 80, attack via the terminal 1, or attack via the terminal 2.

Therefore, the infection specifying unit 12 sets the infection suspicion score to be added from the number "3" of the communication routes that may be an infection route to "0.33 (⅓)", adds it to the past infection suspicion scores of the terminal 1 and the terminal 2, and calculates each infection suspicion score which is a numerical value indicating the degree of suspicion of infection. Regarding allocation of the infection suspicion score when there is a plurality of infection routes, although the case where it is equally distributed route by route, weighted allocation using statistical information is possible, and the method of determining the numerical value is not limited thereto.

Then, the infection specifying unit 12 specifies a candidate for a terminal of a next infection spread destination from the infected terminal and the terminal 50 suspected of infection. In the example of FIG. 5, the terminal 5 connected to the terminal 3 can be infected, with the terminal 3 being the infected terminal as a starting point, and the infection specifying unit 12 specifies the terminal 5 as a candidate for a terminal of an infection spread destination and adds "0.1" to the infection suspicion score. In addition, the infection suspicion score of the terminal 1 and the terminal 2 is "0.33", and therefore the infection specifying unit 12 multiplies "0.33" by "0.1" for the infection spreadable terminal 4 from the terminal 2, and adds "0.03" which is the score rounded down to the three decimal places to the infection risk score.

Accordingly, as illustrated in FIG. 5, the infection risk score of the terminal 4 is "0.13". In this way, when the state of the terminal changes or when the infection suspicion score or the infection risk score changes, the infection specifying unit 12 updates the state information, the infection suspicion score, and the infection risk score of the terminal stored in the configuration information storage device 30.

Figure 6:
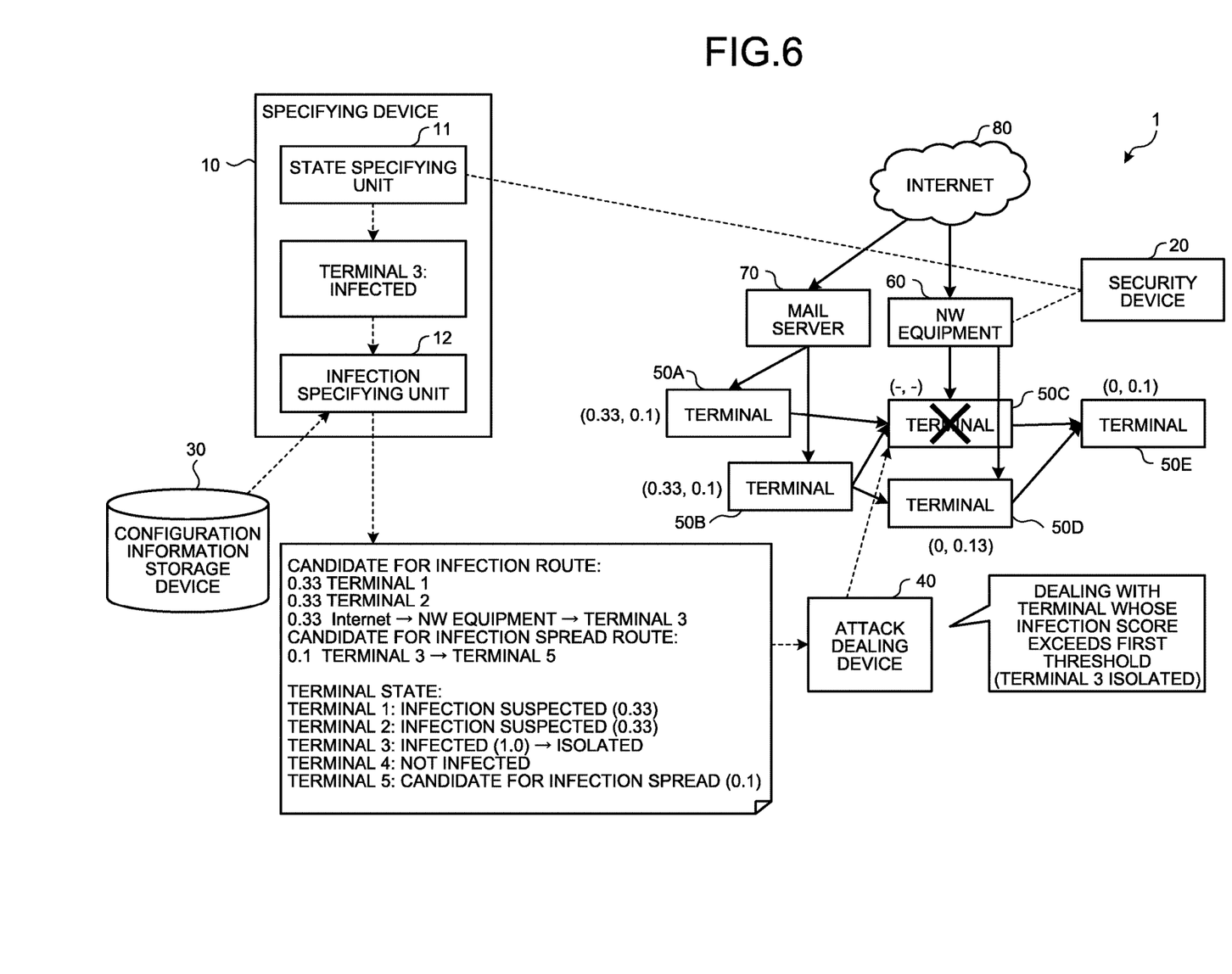
FIG. 6 is a diagram for explaining how to deal with a terminal whose infection is confirmed in an attack dealing device according to the first embodiment.

How to deal with the terminal whose infection is confirmed in the attack dealing device 40 will be explained next with reference to FIG. 6. FIG. 6 is a diagram for explaining how to deal with a terminal whose infection is confirmed in the attack dealing device according to the first embodiment. When the infection suspicion score of the terminal 3 exceeds a first threshold (e.g., "0.9"), the attack dealing device 40 determines how to deal with the terminal 3. As illustrated in FIG. 6, the infection risk score of the terminal 3 is "1.0" which exceeds the first threshold, and how to deal with the terminal 3 is determined. In the example of FIG. 6, because the terminal 3 is a terminal whose infection is confirmed, the attack dealing device 40 isolates the terminal 3 and shuts down the communication related to the terminal 3 as the content of dealing.

Figure 7:
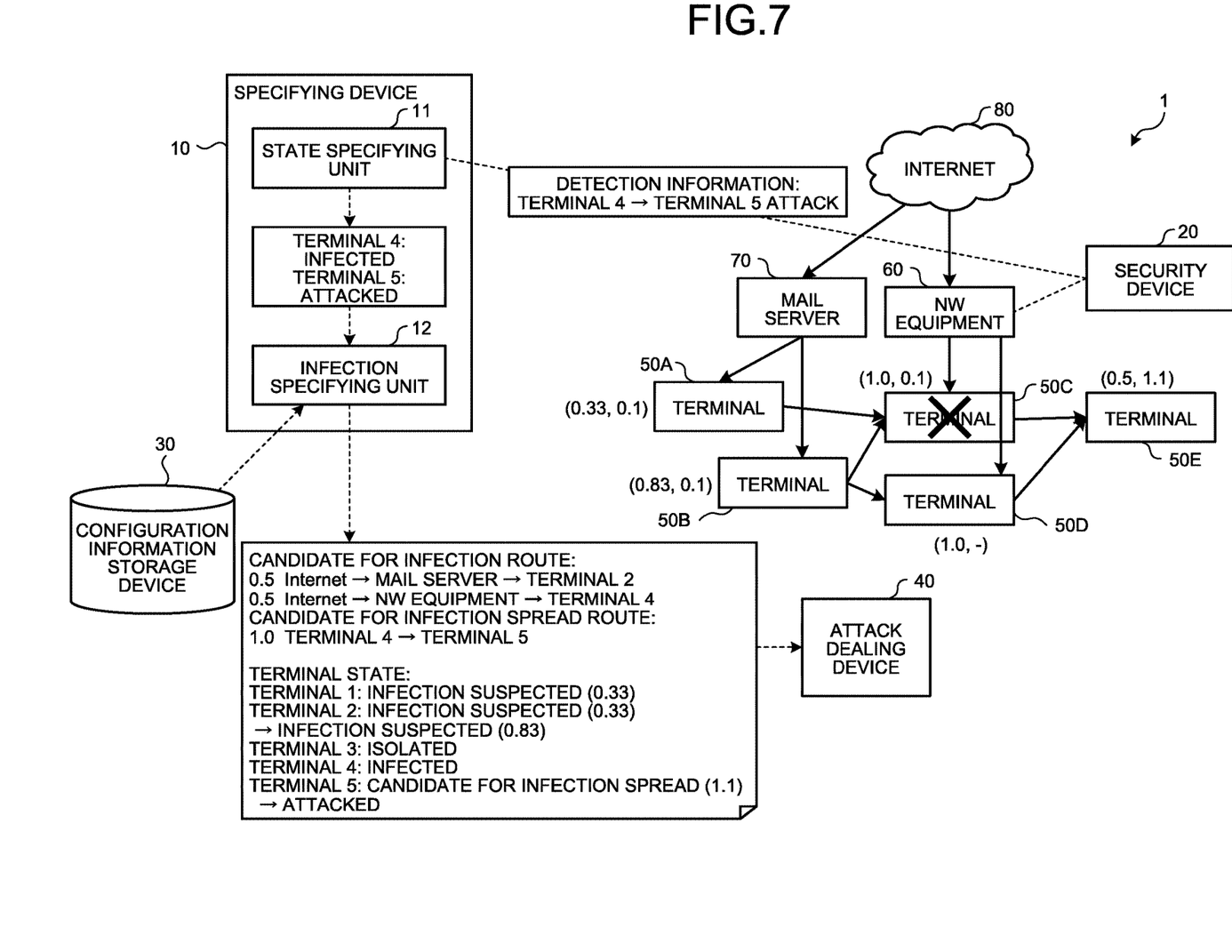
FIG. 7 is a diagram for explaining a process of specifying a terminal suspected of infection and a candidate for an infected terminal in the specifying device according to the first embodiment.
Figure 8:
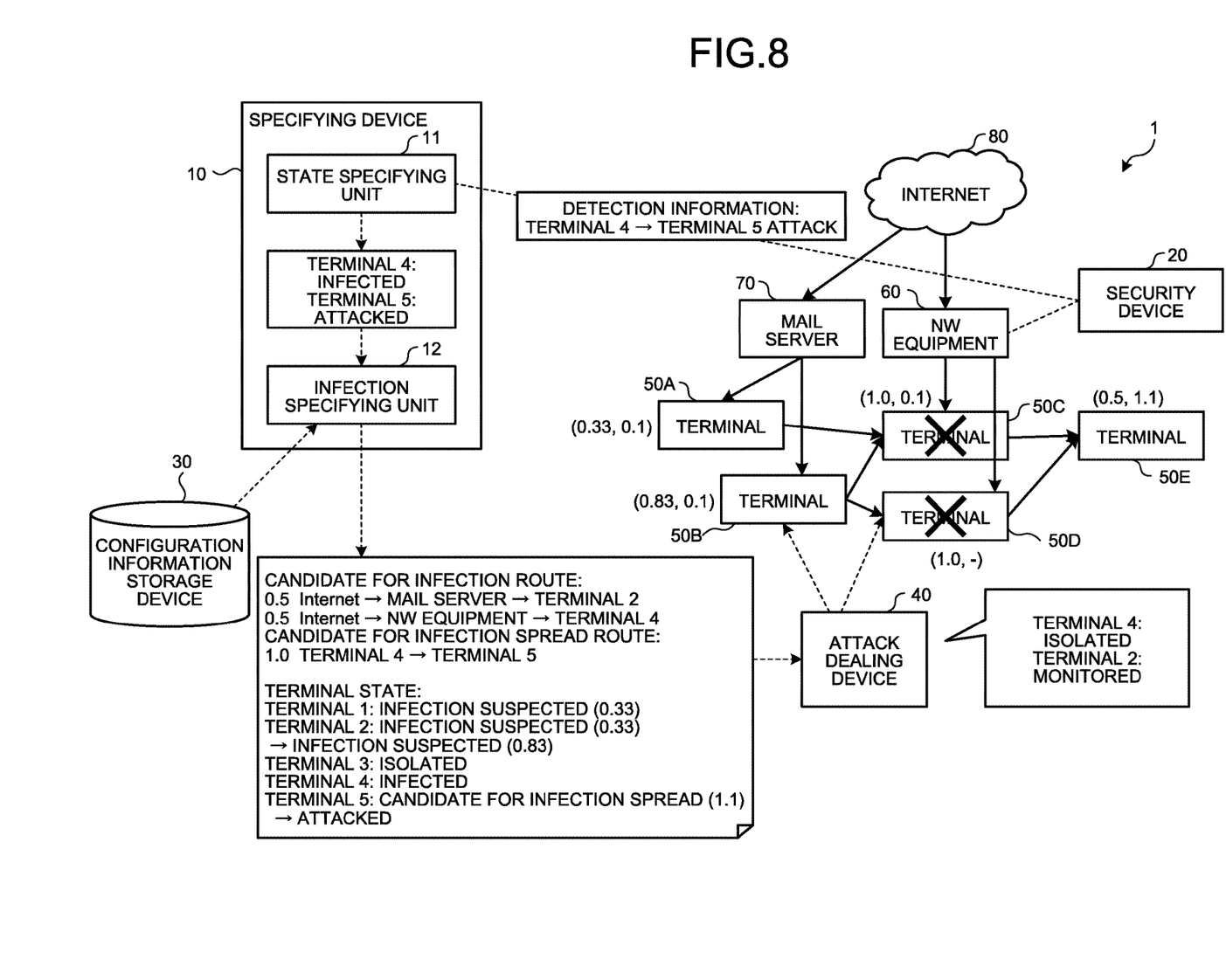
FIG. 8 is a diagram for explaining how to deal with a terminal having a high possibility of infection in the attack dealing device according to the first embodiment.

Processes of the specifying device 10 and the attack dealing device 40 when the security device 20 detects an attack from the terminal 4 to the terminal 5 as a new event will be explained next with reference to FIG. 7 and FIG. 8. FIG. 7 is a diagram for explaining the process of specifying a terminal suspected of infection and a candidate for an infected terminal in the specifying device according to the first embodiment. FIG. 8 is a diagram for explaining how to deal with a terminal having a high possibility of infection in the attack dealing device according to the first embodiment.

As illustrated in FIG. 7, the state specifying unit 11 of the specifying device 10 specifies the states of the terminal 4 and the terminal 5 based on the detection information (attack from the terminal 4 to the terminal 5) received from the security device 20. Here, when detecting the attack from the terminal 4 to the terminal 5, because it can be determined that the terminal 4 is definitely infected with malware, the state specifying unit 11 specifies the state of the terminal 4 as an infected state, adds "1.0" to the infection suspicion score, and sets the infection suspicion score of the terminal 4 to "1.0". In the example of FIG. 7, there are two possible routes of attack in total as a candidate for an infection route to the terminal 4: direct attack via the NW equipment 60 through the Internet 80 and attack via the terminal 2. Therefore, the state specifying unit 11 sets the infection suspicion score to be added from the number "2" of the communication routes that may be an infection route to "0.5 (½)", and adds "0.5" to the infection suspicion score of the terminal 2 located on the candidate for the infection route. As a result, the infection suspicion score of the terminal 2 is "0.83".

Because the terminal 5 is attacked from the terminal 4, the state specifying unit 11 specifies the state of the terminal 5 as an attacked state, adds herein "0.5" to the infection suspicion score, and adds "1.0" to the infection risk score.

As a result, the infection suspicion score of the terminal 5 is "0.5", and the infection risk score thereof is "1.1".

As illustrated in FIG. 8, when the infection suspicion score exceeds a second threshold (e.g., "0.7"), the attack dealing device 40 determines communication monitoring and communication restriction as a dealing with the terminal 2. As illustrated in FIG. 8, because the infection suspicion score of the terminal 2 is "0.83" which exceeds the second threshold, the attack dealing device 40 determines how to deal with the terminal 2. In the example of FIG. 8, because the terminal 2 has a high possibility of infection, the communication monitoring and the communication restriction are carried out as a content of the dealing. In this way, by performing the communication monitoring and the communication restriction on the terminal having a high possibility of infection, it is possible to prevent the infection spread to a new terminal 5 when the terminal 2 is infected and the connection of the external C&C communication from the terminal 2 or the like.

As explained above, in the specifying system 1, it is possible that the specifying device 10 specifies candidate for a terminal suspected of infection by repeating the process of specifying a terminal suspected of infection and a candidate for a terminal likely to be infected in the future each time the security device 20 detects an attack, and specifies an infected terminal other than the detected terminal, for example, by cumulatively calculating the number of times in which the terminal becomes a candidate and the information in which the suspicion of infection is digitized for the candidate terminal, and reduces the spread of hacking and the occurrence of damage when it is infected.

Process Flow of Specifying Device

Figure 9:
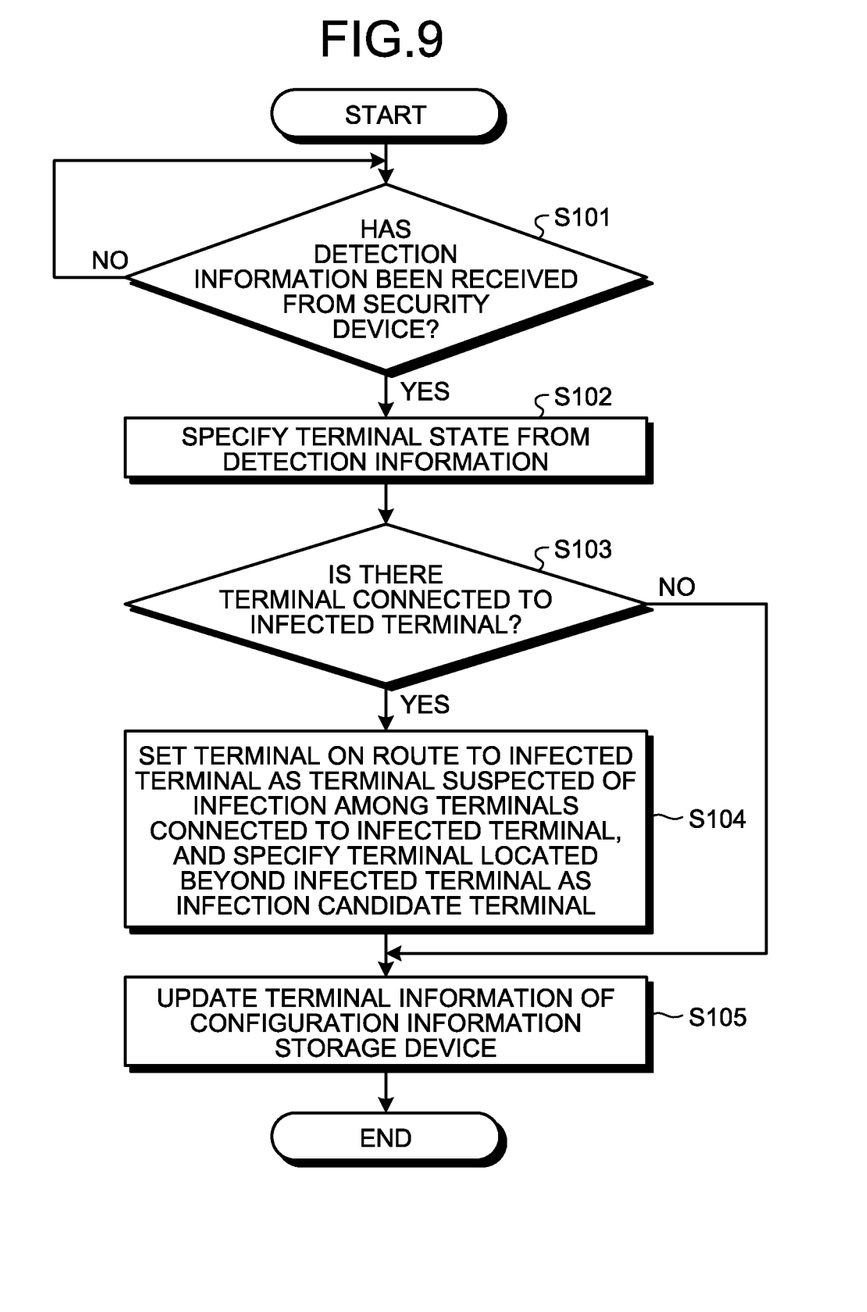
FIG. 9 is a flowchart illustrating a process flow of the specifying device according to the first embodiment.

A process flow of the specifying device 10 according to the first embodiment will be explained next with reference to FIG. 9. FIG. 9 is a flowchart illustrating a process flow of the specifying device according to the first embodiment.

As illustrated in FIG. 9, when receiving detection information from the security device 20 (Yes at Step S101), the state specifying unit 11 of the specifying device 10 specifies the state of the terminal 50 from the information for the terminal 50 and the content of the activity of the terminal included in the detection information (Step S102).

Then when the state specifying unit 11 specifies that the state of the terminal 50 is in a state of being infected with malware, the infection specifying unit 12 of the specifying device 10 refers to the connection information stored in the configuration information storage device 30 to determine whether there is a terminal connected to the infected terminal (Step S103).

As a result, when it is determined that there is no terminal connected to the infected terminal (No at Step S103), the infection specifying unit 12 of the specifying device 10 updates the state information of the terminal in the configuration information storage device 30 (Step S105), and ends the process.

When it is determined that there is a terminal connected to the infected terminal (Yes at Step S103), the infection specifying unit 12 of the specifying device 10 specifies a terminal 50 on the route to the infected terminal as a terminal suspected of infection, among the terminals 50 connected to the infected terminal, and specifies a terminal located beyond the infected terminal as an infection candidate terminal (Step S104). The infection specifying unit 12 updates the state information of the terminal in the configuration information storage device 30 (Step S105), and ends the process.

Process Flow of Specifying System

Figure 10:
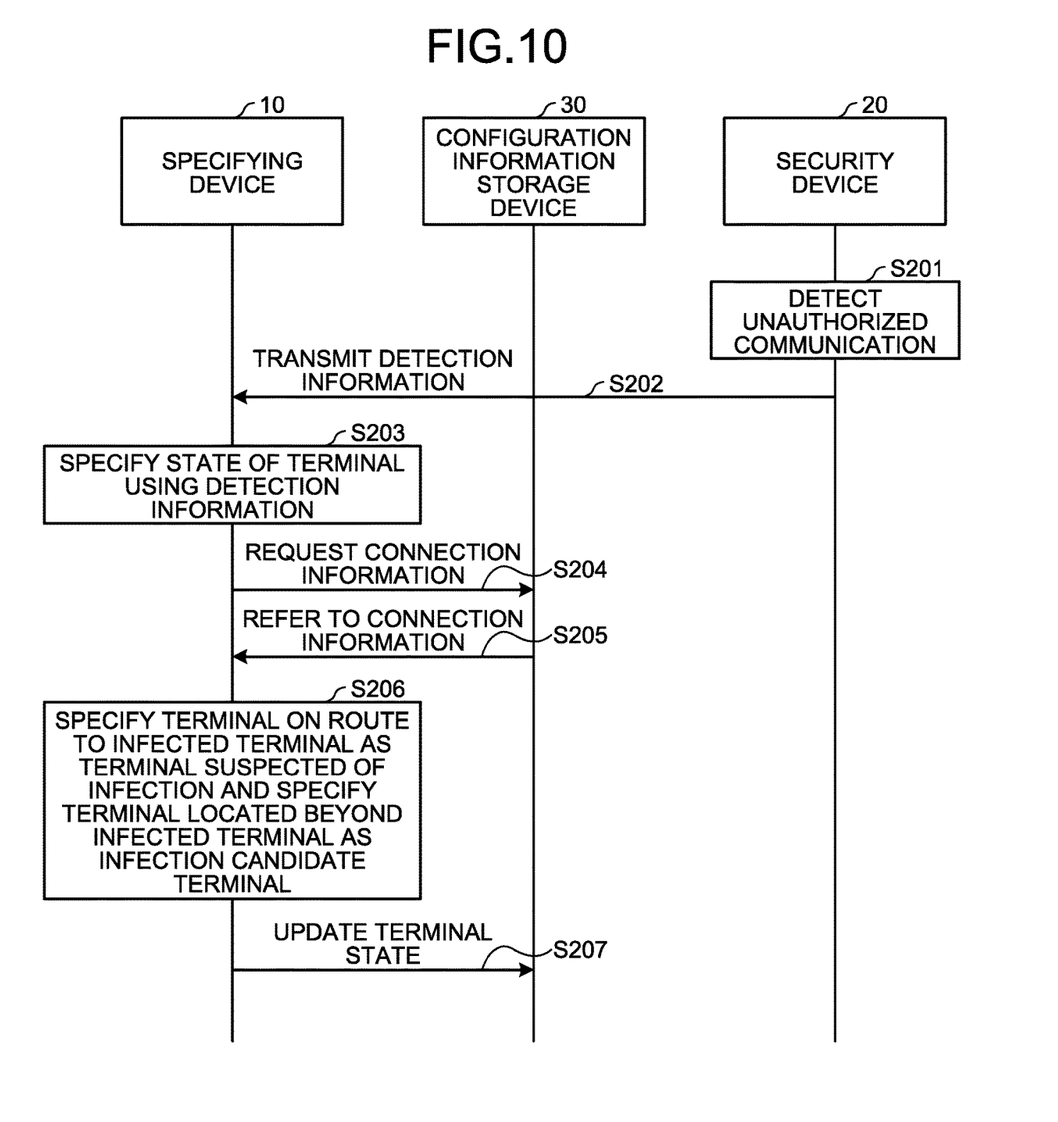
FIG. 10 is a sequence diagram illustrating a process flow of the specifying system according to the first embodiment.

A process flow of the specifying system 1 according to the first embodiment will be explained next with reference to FIG. 10. FIG. 10 is a sequence diagram illustrating a process flow of the specifying system according to the first embodiment.

As illustrated in FIG. 10, when detecting unauthorized communication or the like (Step S201), the security device 20 transmits the detection information to the specifying device 10 (Step S202). When receiving the detection information, the specifying device 10 specifies the state of the terminal 50 using the detection information (Step S203). Specifically, the specifying device 10 specifies the state of the terminal 50 from the information of the terminal 50 and the content of the activity of the terminal included in the detection information.

When it is specified that the state of the terminal 50 is in a state of being infected with malware, the specifying device 10 requests connection information stored in the configuration information storage device 30 (Step S204). Subsequently, the specifying device 10 refers to the requested connection information (Step S205), specifies the terminal 50 on the route to the infected terminal as a terminal suspected of infection among terminals 50 connected to the infected terminal, and specifies a terminal located beyond the infected terminal as an infection candidate terminal (Step S206). Thereafter, the specifying device 10 updates the state information of the terminal in the configuration information storage device 30 (Step S207), and ends the process.

Advantageous Effects of First Embodiment

As explained above, the specifying device 10 according to the first embodiment receives the detection information from the security device 20 that detects hacking into the network or the activity of the terminal 50 related to infection, and specifies the state of the terminal 50 from the information of the terminal 50 and the content of the activity of the relevant terminal 50 included in the detection information. Then when the state specifying unit 11 specifies that the state of the terminal 50 is in a state of being infected with malware, the specifying device 10 specifies a terminal 50 that may be infected before performing the content of the activity of the terminal 50 included in the detection information based on the connection information stored in the configuration information storage device 30, and specifies the terminal 50 located on the route, along which the infected terminal 50 is likely to be used for hacking or for infection of the terminal in the future, as a candidate for an infected terminal likely to be infected. Therefore, it is possible not only to detect the infected terminal but also to specify a terminal suspected of infection or a candidate for an infected terminal likely to be infected in the future.

In other words, for example, when detecting an event or the like related to a target-type attack and an APT attack, the specifying device 10 can specify not only a detected terminal but also a terminal which becomes a route to the detected terminal and a candidate for a terminal of hacking/infection spread destination, which makes it possible to perform monitoring enhancement, communication restriction, and communication shut-down, etc. on these terminals.

System Configuration Etc.

In addition, the components of the illustrated devices are functionally conceptual, and are not necessarily configured as physically illustrated ones. In other words, the specific mode of decentralization and integration of the devices is not limited to the illustrated ones, and it may be configured by functionally or physically decentralizing or integrating all or part of the devices in an arbitrary unit according to various loads and usage conditions. For example, regarding the functions of the state specifying unit 11 and the infection specifying unit 12 of the specifying device 10, separate devices may have the respective functions. For example, the specifying device 10 may store the information of the configuration information storage device 30, or may have the functions of the attack dealing device 40. Furthermore, all or arbitrary part of the processing functions performed in each of the devices can be implemented by the CPU and by the program analyzed and executed by the CPU, or implemented as hardware by wired logic.

Of the processes explained in the present embodiment, all or part of the processes explained as automatically performed ones can be manually performed, or all or part of the processes explained as manually performed ones can be also automatically performed using known methods. In addition, the information including the procedures, the control procedures, the specific names, the various data, and the parameters illustrated in the documents and the drawings can be arbitrarily modified unless otherwise specified.

Programs

As an embodiment, the specifying device 10 can be implemented by installing a specifying program for executing a specifying process as package software or online software into a desired computer. For example, by causing the information processing device to execute the specifying program, the information processing device can be functioned as the specifying device 10. The information processing device mentioned here includes, for example, a desktop personal computer or a notebook personal computer. Moreover, by setting the terminal device used by the user as a client, it can be implemented as a server device that provides services related to the specifying process to the user. For example, the specifying device 10 is implemented as a server device that not only detects an infected terminal but also provides a processing service for specifying a terminal suspected of infection and a candidate for the infected terminal likely to be infected in the future. In this case, the specifying device 10 may be implemented as a Web server or may be implemented as a cloud for providing services related to the specifying process through outsourcing.

Figure 11:
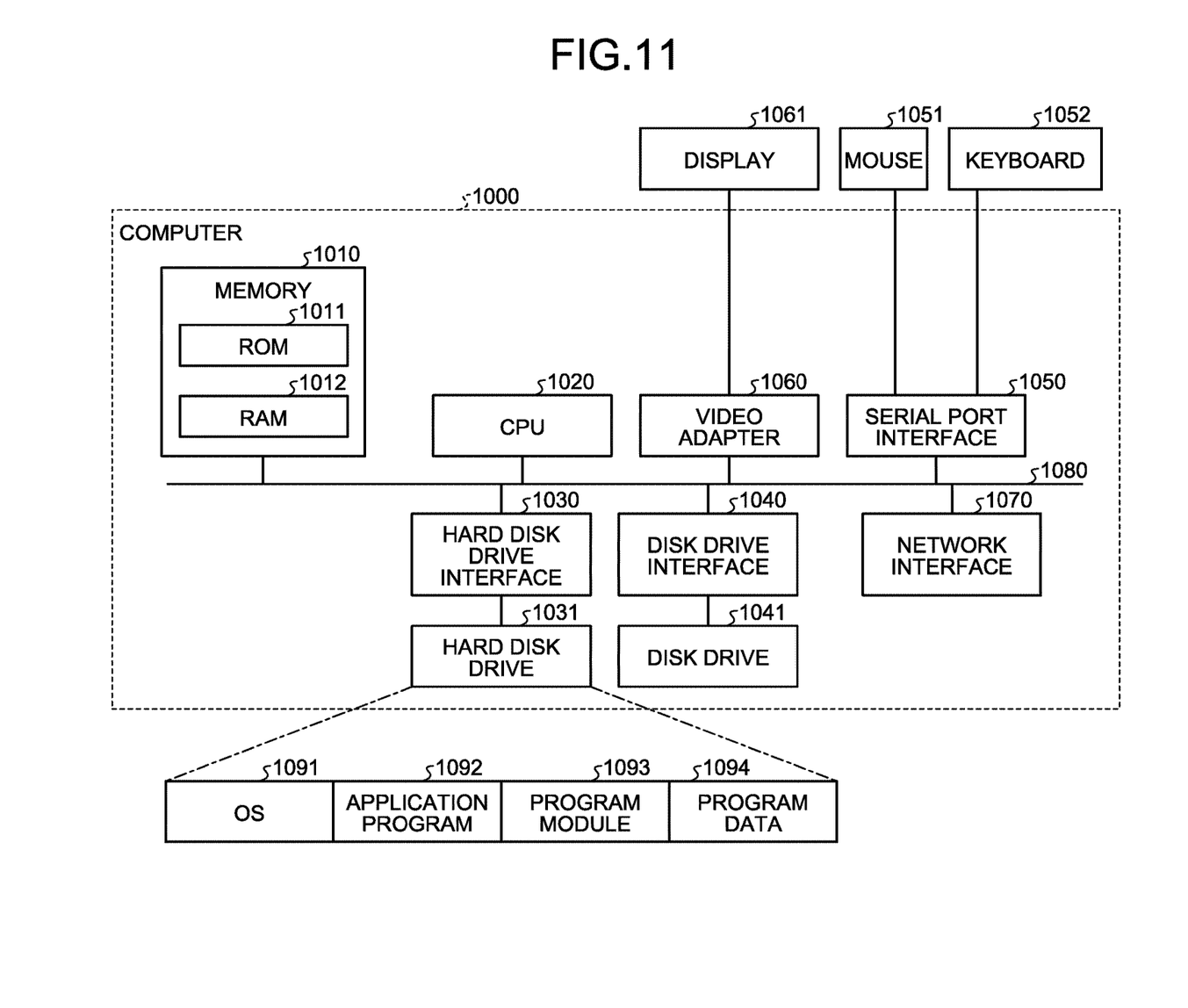
FIG. 11 is a diagram illustrating a computer that executes a specifying program.

FIG. 11 is a diagram illustrating a computer that executes the specifying program. A computer 1000 includes, for example, a memory 1010 and a CPU (Central Processing Unit) 1020. The computer 1000 also includes a hard disk drive interface 1030, a disk drive interface 1040, a serial port interface 1050, a video adapter 1060, and a network interface 1070. These units are connected to each other via a bus 1080.

The memory 1010 includes ROM (Read Only Memory) 1011 and RAM (Random Access Memory) 1012. The Rom 1011 stores, for example, a boot program such as BIOS (Basic Input Output System). The hard disk drive interface 1030 is connected to a hard disk drive 1031. The disk drive interface 1040 is connected to a disk drive 1041. For example, a removable storage medium such as a magnetic disk and an optical disk is inserted in the disk drive 1041. The serial port interface 1050 is connected to, for example, a mouse 1051 and a keyboard 1052. The video adapter 1060 is connected to, for example, a display 1061.

The hard disk drive 1031 stores, for example, an OS 1091, an application program 1092, a program module 1093, and program data 1094. In other words, the program for defining each process of the specifying device 10 is implemented as the program module 1093 in which codes executable by the computer are written. The program module 1093 is stored in, for example, the hard disk drive 1031. For example, the program module 1093 for executing the same processing as the functional configuration in the specifying device 10 is stored in the hard disk drive 1031. The hard disk drive 1031 may be replaced by SSD (Solid State Drive).

The setting data used for the processing in the embodiment is stored as the program data 1094 in, for example, the memory 1010 and the hard disk drive 1031. The CPU 1020 loads the program module 1093 or the program data 1094 stored in the memory 1010 or in the hard disk drive 1031 into the RAM 1012 as needed, and executes them.

The program module 1093 and the program data 1094 are not limited to the case where both are stored in the hard disk drive 1031, and may be stored in, for example, a removable storage medium and read by the CPU 1020 via the disk drive 1041 etc. Alternatively, the program module 1093 and the program data 1094 may be stored in other computer connected thereto via a network (LAN (Local Area Network) and WAN (Wide Area Network) etc.). The program module 1093 and the program data 1094 may be read by the CPU 1020 from other computer via the network interface 1070.

REFERENCE SIGNS LIST

1 Specifying system
10 specifying device
11 state specifying unit
12 infection specifying unit
20 security device
30 configuration information storage device
40 attack dealing device
50, 50A to 50E terminal
60 NW equipment
70 mail server
80 Internet

The invention claimed is:

1. A specifying system comprising a configuration information storage device that stores information on a terminal in a network and a specifying device that specifies a state of the terminal, wherein
the configuration information storage device stores connection information indicating a connection relation between terminals in the network, and the specifying device includes
a memory; and
processing circuitry coupled to the memory and configured to execute a process comprising:
receiving detection information from a security device that detects hacking into the network or an activity of a terminal related to infection and state specifying a state of the terminal from information of the terminal and content of activity of the terminal, which indicates that the terminal is infected, included in the detection information, and
specifying, when specifying that the terminal is in the state of being infected with malware,
(i) a suspicion score of each of one or more other terminals in the network, before each of the one or more other terminals in the network perform the content of the activity included in the detection information, based on the connection information stored in the configuration information storage device, the suspicion score indicating a degree of suspicion of present infection of the one or more other terminals in the network based on whether each of the one or more other terminals transmits data toward the infected terminal and further based on a total number of devices that transmit data toward the infected terminal, and
(ii) an infection risk score that indicates a degree of risk of future infection of each of the one or more other terminals on a basis of being located on a route downstream from the infected terminal, along which the infected terminal is determined as likely to be used for hacking or for infection of the terminal in the future based on the connection information stored in the configuration information storage device.

2. The specifying system according to claim 1, wherein the state specifying specifies, when the detection information is information on communication, states of terminals corresponding to a source address and a destination address of the communication, and specifies, when the detection information is information on a terminal, the states of the terminals.

3. The specifying system according to claim 1, wherein the configuration information storage device stores address information of terminals in the network, terminal state information indicating a state of the terminal specified in the state specifying, and the terminal suspected of infection and the candidate for the infected terminal which are specified in the infection specifying.

4. The specifying system according to claim 1, wherein the suspicion score is a numerical value indicating a degree of suspicion of infection, for each terminal suspected of infection, based on the number of communication routes that are determined as likely infection routes based on the connection information and the states of terminals in the past.

5. The specifying system according to claim 1, further comprising an attack dealing device, wherein
the attack dealing device performs at least one of communication shut-down, communication monitoring, and communication restriction on the infected terminal specified in the state specifying and on a terminal having an infection suspicion score that exceeds a threshold.

6. The specifying system according to claim 5, wherein the attack dealing device shuts down the communication of the terminal when an infection suspicion score exceeds a first threshold, and performs communication monitoring and communication restriction on the terminal when the infection suspicion score exceeds a second threshold.

7. A specifying device comprising:
a memory; and
processing circuitry coupled to the memory and configured to execute a process comprising:
receiving detection information related to detection from a security device that detects hacking into a network including a plurality of terminals or an activity of a terminal related to infection, and state specifying a state of the terminal from information of the terminal and content of activity of the terminal, which indicates that the terminal is infected, included in the detection information, and
specifying, when specifying that the terminal is in the state of being infected with malware,
(i) a suspicion score of each of one or more other terminals in the network, before each of the one or more other terminals in the network perform the content of the activity included in the detection information, based on connection information indicating a connection relation between the terminals in the network, the suspicion score indicating a degree of suspicion of present infection of the one or more other terminals in the network based on whether each of the one or more other terminals transmits data toward the infected terminal and further based on a total number of devices that transmit data toward the infected terminal, and (ii) an infection risk score that indicates a degree of risk of future infection of each of the one or more other terminals on a basis of being located on a route downstream from the infected terminal, along which the infected terminal is determined as likely to be used for hacking or for infection of the terminal in the future based on the connection information.

8. A specifying method executed by a specifying device, the method comprising:

receiving detection information related to detection from a security device that detects hacking into a network including a plurality of terminals or an activity of a terminal related to infection, and state specifying a state of the terminal from information of the terminal and content of activity of the terminal, which indicates that the terminal is infected, included in the detection information, and specifying, when specifying that the terminal is in the state of being infected with malware, (i) a suspicion score of each of one or more other terminals in the network, before each of the one or more other terminals in the network perform the content of the activity included in the detection information, based on connection information indicating a connection relation between the terminals in the network, the suspicion score indicating a degree of suspicion of present infection of the one or more other terminals in the network based on whether each of the one or more other terminals transmits data toward the infected terminal and further based on a total number of devices that transmit data toward the infected terminal, and (ii) an infection risk score that indicates a degree of risk of future infection of each of the one or more other terminals on a basis of being located on a route downstream from the infected terminal, along which the infected terminal is determined as likely to be used for hacking or for infection of the terminal in the future based on the connection information.

\* \* \* \* \*